United States Patent
Patel et al.

(10) Patent No.: US 6,850,615 B1
(45) Date of Patent: Feb. 1, 2005

(54) METHOD AND SYSTEM FOR PROVIDING INFORMATION TO AN EXTERNAL USER REGARDING THE AVAILABILITY OF AN AGENT

(75) Inventors: Labhesh Patel, San Jose, CA (US); Chris See Liang Yeo, Santa Clara, CA (US); Martine Schepers, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 587 days.

(21) Appl. No.: 09/882,705

(22) Filed: Jun. 14, 2001

(51) Int. Cl.[7] ............................................. H04M 3/523
(52) U.S. Cl. ............................ 379/266.06; 379/265.03; 379/265.09
(58) Field of Search ....................... 379/265.01, 265.02, 379/265.03, 265.04, 265.05, 265.06, 265.07, 265.08, 265.09, 266.01, 266.02, 266.03, 266.06, 266.08

(56) References Cited

U.S. PATENT DOCUMENTS

| | | | |
|---|---|---|---|
| 4,788,715 A | * 11/1988 | Lee | 379/84 |
| 5,214,688 A | * 5/1993 | Szlam et al. | 379/266.08 |
| 5,729,600 A | 3/1998 | Blaha et al. | 379/266.07 |
| 5,987,118 A | 11/1999 | Dickerman et al. | 379/265.01 |
| 6,088,443 A | 7/2000 | Darland et al. | 379/265.13 |
| 6,111,947 A | 8/2000 | Galgano, Jr. et al. | 379/269 |
| 6,188,761 B1 | 2/2001 | Dickerman et al. | 379/265.01 |
| 6,263,065 B1 | * 7/2001 | Durinovic-Johri et al. | 379/266.03 |
| 6,496,580 B1 | 12/2002 | Chack | 379/266.01 |
| 6,546,087 B2 | 4/2003 | Shaffer et al. | 379/90.01 |

* cited by examiner

Primary Examiner—Harry S. Hong
(74) Attorney, Agent, or Firm—Baker Botts L.L.P.

(57) ABSTRACT

A method and system are provided for availing to an external user, in real time, particular information regarding the availability of at least one agent in an automatic call distribution ("ACD") system, e.g., prior to the connection being made. Initially, status data is received from the ACD system. The status data may include a number of agents available on the ACD system and/or a current wait time that at least one further user is waiting to be connected the agent. Then, the status data is configured so that the external user is able to obtain the particular information based on the status data.

100 Claims, 2 Drawing Sheets

FIG. 1

METHOD AND SYSTEM FOR PROVIDING INFORMATION TO AN EXTERNAL USER REGARDING THE AVAILABILITY OF AN AGENT

TECHNICAL FIELD OF THE INVENTION

The present invention relates in general to automatic call distribution systems, and more particularly to a method and system for providing information to an external user or caller regarding the availability of an agent.

BACKGROUND OF THE INVENTION

An automatic call distribution ("ACD") system is a specialized telephone system used in incoming call centers. This ACD system automatically answers the calls from users (e.g., callers), queues these calls, distributes them to agents, plays predetermined delay announcements to the users and provides real-time and historical reports on these activities. Many companies offering sales and service support use ACD systems to queue callers and route the calls to the agents.

Conventional ACD systems are utilized in call centers to provide information automatically to callers based on programmed database handling instructions, and to route callers to agents. When a caller calls into a call center, the ACD system associated with the call center can provide information to the caller. One of the features of the ACD system is its ability to allow the caller to request an agent, e.g., by depressing the number zero ("0") on the caller's respective telephone keypad. After requesting a connection to the agent, the ACD system typically routes the caller through a queue before connecting the caller to the agent. If no agent is available or if all agents are busy, certain conventional ACD systems inform the caller of such agent unavailability, lets the caller know how long the approximate wait will be for an agent, and then places the call requesting the ACD agent in a queue to wait for the next available agent; in the order that the call was received with respect to other callers waiting for a connection to the agent. The callers may also be ordered according to a predetermined priority scheme.

However, it is disadvantageous to have the callers wait for long periods of time to reach the agent. For example, the caller may be frustrated with the wait, and become dissatisfied with the entity whose ACD system the caller is contacting. In addition, such entity is likely being charged for the wait time while the caller is placed in the queue if, e.g., the user is calling an "800"-type number. In addition, if the caller is paying for the call, it is the caller who is being charged for the wait time while being in the queue and waiting for his or her connection to the next available agent.

SUMMARY OF THE INVENTION

In accordance with the teachings of the present invention, the disadvantages and problems associated with conventional ACD systems and methods have been substantially reduced or eliminated by providing the external users information regarding the availability of the agents.

In an aspect of the present invention, the method and system are provided for availing to an external user (e.g., a caller), in real time, particular information regarding the availability of at least one agent in an automatic call distribution ("ACD") system. Initially, status data is received from the ACD system. The status data may include a number of agents available on the ACD system, a rate of calls answered by the agent, a number of external users in a queue waiting for a connection to the agent, and/or a wait time for the connection to the agent. Then, the status data is configured so that the user is able to obtain the particular information based on the status data.

In another aspect of the present invention, a request for the particular information may be received from the user. In response to the request, the particular information is forwarded to the user. The particular information may be forwarded to the user prior to the user requesting a connection to the agent. The particular information can be forwarded to the user in an e-mail. In addition, the status data can be stored in a storage arrangement.

In yet another embodiment of the present invention, a request for the particular information can be received from the user. Then, in response to the request, the user is connected to a processing arrangement which communicates with the storage arrangement. The status data is retrieved from the storage arrangement by the processing arrangement. Thereafter, the particular information is provided to the user from the processing arrangement as a function of the status data retrieved from the storage arrangement.

According to still another embodiment, the processing arrangement can be a Web server, which is either incorporated into the ACD system or separate from the ACD system. The Web server may receive the request from the user. This request can be a Hyper Text Transfer protocol message. The particular information can be displayed on a display device of the user, e.g., using a template. The template can modify the display of the particular information on the user display. In addition, the template can be modifiable, and may be specific for every user, or for different ACD systems.

The users (e.g., the callers) can use the data provided to decide if they should call. The users may prefer to wait until the wait time is reasonable before calling, which would save the company operating the ACD system the costs associated with the wait times. It would also reduce the load on the ACD system that may otherwise be subjected to a load beyond its capacity.

Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
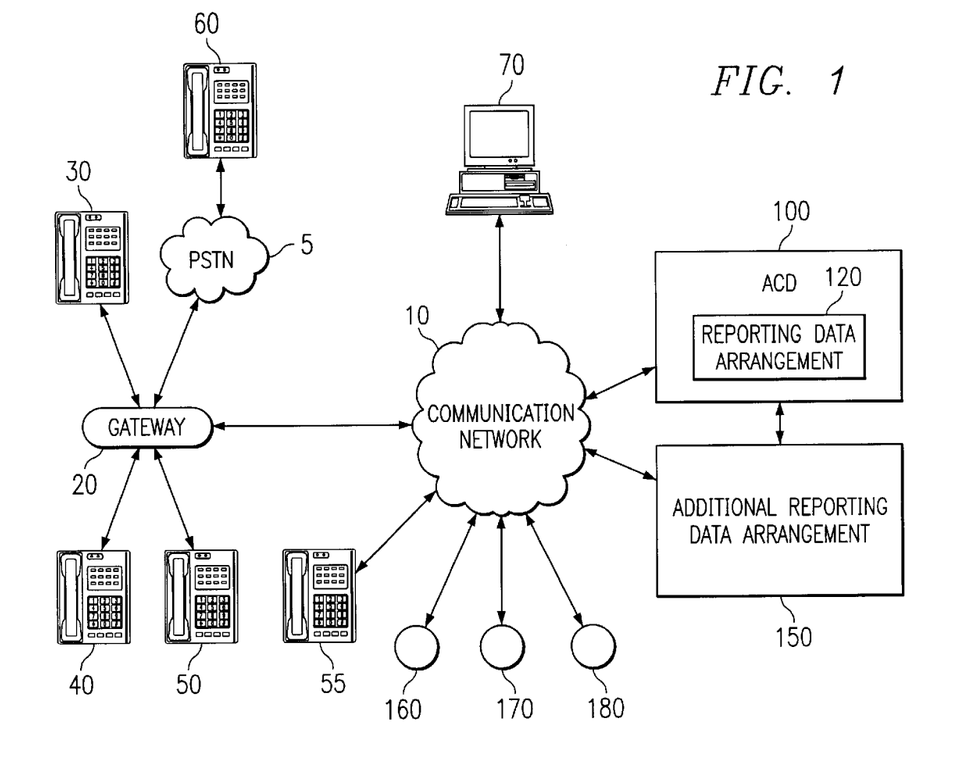
FIG. 1 is an exemplary embodiment of a system according to the present invention in which users (e.g., callers) communicate with one another, and with an automatic call distribution system, data reporting arrangements and other devices.

FIG. 1 illustrates an exemplary embodiment of a system according to the present invention. In this exemplary system, multiple user (e.g., caller) devices 30, 40, 50 are connected to a communication network 10 via a gateway 20. An automatic call distribution ("ACD") system 100, which may include a reporting data arrangement 120, is also connected to the communication network 10. Other devices and/or systems can be connected to this communications network 10, such as a computer 70, an additional reporting data arrangement 150, etc. Agents 160, 170, 180 are also connected to the communication network 10. In one a exemplary embodiment, the ACD system 100 can be, e.g., a Cisco integrated contact distribution ("ICD").

The communication network 10 may be a local area network (LAN), wide area network (WAN), global distributed network such as the Internet, intranet, extranet, or any other form of wireless or wireline communication network. The communication network 10 may include any combination of routers, hubs, switches, servers, printers, workstations, minicomputers and other hardware and/or software that allow for the exchange of the packets in the network 10. Generally, the communication network 10 facilitates the transmission and reception of packets, cells, frames, or other portion of information (generally referred to as packets) for communication between the caller devices 30, 40, 50 connected to the gateway 20 and the ACD system 100. In addition, the communication network 10 also enables communications between the devices connected thereto. Further, the communication between the devices connected to the communication network 10 with the devices connected to a public switched telephone network ("PSTN") 5 can also be effectuated. According to the present invention, the user device can be connected to the gateway 20 via the PSTN 5 for communicating via the communication network 10. It is also possible to provide another user device 55 which can be directly connected to the communication network 10. In addition, the communication network 10 facilitates communication between the caller devices 30, 40, 50, 55, 60 (which shall be referred herein below as the "user devices"), the computer 70, the ACD system 100 and the additional reporting data arrangement 150.

Each of the user devices 30, 40, 50, 55, 60 can be capable of transmitting and receiving any media (e.g., data, voice and video streams) via the communication network 10. These streams can be converted into a suitable analog or digital form to allow the user devices 30, 40, 50, 55 to communicate with the devices that are not connected to the communications network 10, e.g., communicating with analog-based telephones, such as the user device 60, which are connected to the PSTN 5.

Each of the user devices 30, 40, 50, 55, 60 may be any combination of hardware and/or software that provide communication services, including media, to an external user (e.g., a caller) communicating with the respective user device. For example, each of the user devices 30, 40, 50, 55, 60 may be a telephone (as shown in FIG. 1), a computer executing a telephone-related software, a video monitor incorporated with an audio transceiving device, a camera, or any other communication or processing hardware and/or software that supports the communication of the media using the communications network 10. Although FIG. 1 illustrates five user devices 30, 40, 50, 55, 60, any number of the user devices can be connected to the network 10 for transceiving media streams. The user devices 30, 40, 50, 55, 60 can be digital-based or analog based, and can be directly connected to the communication network 10 or the PSTN 5.

The communication network 10 may support any form and combination of point-to-point, multicast, unicast, or other techniques for exchanging the media packets between the components provided on the communication network 10. In one exemplary embodiment, the communication network 10 can be a voice over internet ("VoIP") network which facilitates voice-type communication between the Internet Protocol ("IP") telephones by transmitting voice information in digital form in discrete packets. The communication network 10 may also be a network which utilizes protocols other than the Internet Protocol.

The agents 160, 170, 180 can be agents of an entity maintaining and/or operating the ACD system 100. These agents 160, 170, 180 can communicate with the ACD system 100 via the communication network 10 (as shown in FIG. 1) or may be connected to the ACD system 100 for such communication via other network(s). The agents 160, 170, 180 communicate with the external users via the respective user devices 30, 40, 50, 55, 60 to provide these external users the information they require.

Figure 2:
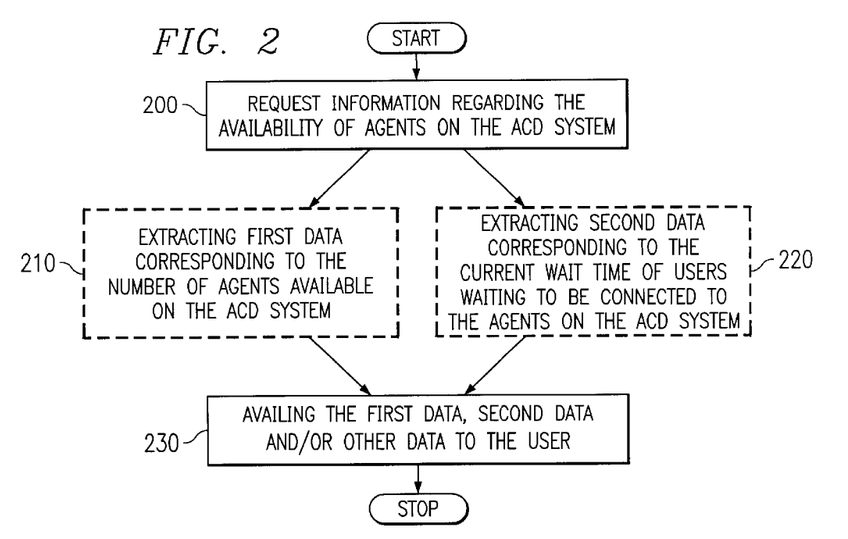
FIG. 2 is a flow diagram illustrating an exemplary embodiment of a method for availing information to the users regarding the availability of an agent.

FIG. 2 illustrates a flow diagram of an exemplary embodiment of a method according to the present invention for availing information to the external users regarding the availability of an agent. In one exemplary implementation, this exemplary method can be performed using the reporting data arrangement 120 of the ACD system 100, which is configured to keep track of the status and availability of the agents and queues. The reporting data arrangement 120 can include a Web Server to which the user devices 30, 40, 50, 55, 60 can be connected.

Particularly, in step 200 of FIG. 2, the reporting data arrangement 120 may request information regarding the availability of the agents 160, 170, 180 connected to the ACD system 100. Then, the reporting data arrangement 120 may obtain first data corresponding to the number of the agents 160, 170, 180 who are available on the ACD system 100 (step 210). The reporting data arrangement 120 may also obtain second data corresponding to the current wait time of the external users who are waiting to be connected to the agents on the ACD system 100 (step 220). It should be understood that the reporting data arrangement 120 may request one or both of the first data and the second data. Other data can also be requested, which can include the wait time for a connection to the agent(s), the rate (e.g., an average rate) of external user calls answered by the agent(s), and/or the number of calls in the queue of the ACD system 100.

Thereafter, in step 230, the reporting data arrangement 120 makes the first data, second data and/or other relevant data available to the external user(s). It is also possible to store the first data, the second data and/or the other relevant data in a storage arrangement for future use and/or statistical analysis. The storage arrangement can be external from the ACD system 100, and may communicate therewith. The storage arrangement may also be incorporated into the ACD system 100. In this manner, the availability of the agents by the external user(s) may be established by using the information provided in the first data, the second data and/or the other data, and such results may be stored in the storage arrangement for future use.

Figure 3A:
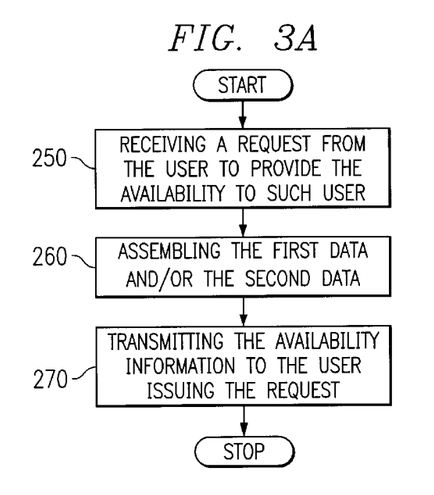
FIG. 3A is flow diagram illustrating a first embodiment of the method for providing the agent availability information to the caller/users.

FIG. 3A shows a flow diagram of a first exemplary embodiment of the method for providing the agent availability information to the external users which can be implemented by the reporting data arrangement 120. In particular, in step 250, the reporting data arrangement 120 may receive a request from the external user via, e.g., the user device 30 or the computer 70 to provide to such external user the information regarding the availability of the agents, e.g., the agents 160, 170, 180. In response to this request, in step 260, the reporting data arrangement 120 can assemble the first, second and other relevant data described above by executing the method described above which references FIG. 2, and by utilizing the results obtained from step 230. As an alternative, its is possible to retrieve and assemble the first data, the second data and/or other relevant data which were previously stored in the storage arrangement. Then, in step 270, the reporting data arrangement 120 may transmit the information relating to the availability of the agents, based on the first data, the second data and/or other relevant data, to the external user who issued the request.

Figure 3B:
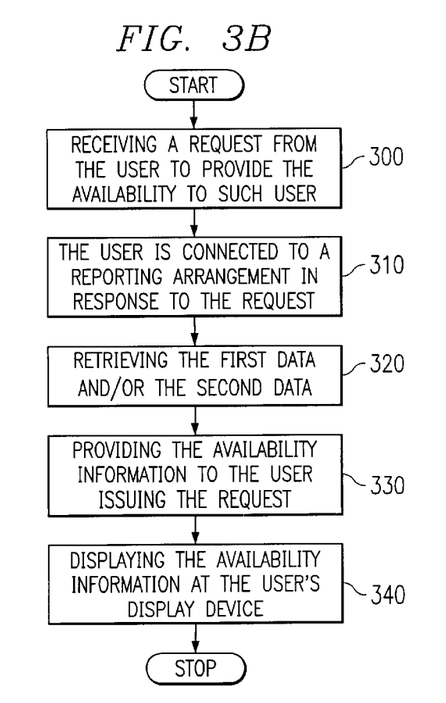
FIG. 3B is flow diagram illustrating a second exemplary embodiment of the method for providing the agent availability information to the users.

FIG. 3B shows a flow diagram of a second exemplary embodiment of the method for providing the agent availability information to the external users, which can also be implemented by the reporting data arrangement 120. For example, in step 300 and similarly to step 250, the reporting data arrangement 120 may receive a request from the external user via, e.g., the user device 30 or the computer 70 to provide to such external user the information regarding the availability of the agents. In response to this request, in step 310, the external user can be connected to the reporting data arrangement 120 (using the respective user device or the computer 70). Then, in step 320, the reporting data arrangement 120 can retrieve the first data and/or the second data as described above for the first exemplary embodiment with reference to step 260 of FIG. 3A. In step 330, the reporting data arrangement 120 may provide the information relating to the availability of the agents based on the first data and/or the second data who issued the request. Thereafter, in step 340, this availability information can be displayed on the user's display device, which can be provided on the user device 30, the monitor of the computer 70 or on another display device to which the external user requesting the availability information has access.

In one exemplary embodiment, the availability information which is displayed on the display device can be configured for each external user and/or ACD system. This can be performed using templates which determine what type of data is being displayed, and the format that will be displayed. These templates can depend on the user's profile (e.g., transmitted with the request for the availability information), and can be easily modified based on the current requirements or needs of the external users and/or the entity maintaining the ACD system 100.

Thus, using these exemplary embodiments of the present invention, the external user may obtain the information regarding the number of the agents who are available on the ACD system 100, the wait time for a connection to the agent(s), the rate (e.g., an average rate) of external user calls answered by the agent(s), and/or the number of calls in the queue of the ACD system 100. For example, the wait time can include the current wait time that one or more of the external users are waiting to be connected to the agent(s). The wait time can also include an average wait time or an estimated wait time of a new incoming call form the external user(s) in the ACD system 100. In another exemplary embodiment of the present invention, such user waits until he or she receives the information regarding the availability of the agents prior to the external user requesting the connection to and/or assistance of the agents. In addition to displaying the availability information at the user's display device as described above with reference to FIG. 3B, it is possible to transmit this information to the external user in an e-mail form.

As described above, the reporting data arrangement 120 may be a Web Server. In operation, when the user request the information regarding the availability of the agents via the communication network 10, the Web Server may provide a link to a common gateway interface ("CGI") script or an applet for such external user. Such CGI script or applet can collect the agent availability information and/or wait time to be connected the available agent on the reporting data arrangement 120, and forward this information to the respective user device (e.g., the user device 30).

In certain scenarios, many user devices (e.g., the user devices 30, 40, 50, 55, 60) may attempt to establish a connection (e.g., a remote method invocation "RMI" connection) with the ACD system 100 and the reporting data arrangement 120. In this situation, the performance of the ACD system 100, the reporting data arrangement 120 and/or other devices and components communicating therewith may be diminished. Accordingly, to address this issue, yet another embodiment of the present invention can be provided in which the user devices 30, 40, 50, 55, 60 may connect (e.g., using the RMI connection) to the additional reporting data arrangement 150. This additional reporting data arrangement 150 can be a Web Server which receives the availability information from the reporting data arrangement 100 of the ACD system 100. For example, the user devices may transmit "http" requests to this additional reporting data arrangement 150 (which are significantly less resource intensive than the RMI connection) to receive the availability information therefrom. Then, the additional reporting data arrangement 150 provides this requested information to the respective user devices.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed it:

1. A method for availing to an external user, in real time, particular information regarding the availability of at least one agent in an automatic call distribution ("ACD") system, comprising the steps of:
   a) receiving status data from the ACD system, the status data including at least one of:
      i. a number of agents available on the ACD system,
      ii. a rate of calls answered by the at least one agent,
      iii. a number of external users in a queue waiting for a connection to the at least one agent, and
      iv. a wait time for the connection to the at least one agent;
   b) configuring the status data so that the external user is able to obtain the particular information based on the status data;
   c) receiving from the external user, a request for the particular information; and
   d) forwarding the particular information to the external user in response to the request.

2. The method according to claim 1, wherein steps (c) and (d) are performed prior to the user requesting a connection to the at least one agent.

3. The method according to claim 1, wherein, in step (d), the particular information is forwarded to the user in an e-mail.

4. The method according to claim 1, wherein step (b) includes the substep of storing the status data in a storage arrangement.

5. The method according to claim 4, further comprising the steps of:

e) receiving a request for the particular information from the user;

f) in response to the request, connecting the user to a processing arrangement which communicates with the storage arrangement;

g) retrieving the status data, from the storage arrangement, by the processing arrangement; and h) providing the particular information to the user from the processing arrangement as a function of the status data retrieved from the storage arrangement.

6. The method according to claim 5, wherein the processing arrangement is a Web server.

7. The method according to claim 6, wherein the Web server is incorporated into the ACD system.

8. The method according to claim 6, wherein the Web server is separate from the ACD system.

9. The method according to claim 8, wherein the Web server receives the request from the user.

10. The method according to claim 9, wherein the request is a Hyper Text Transfer protocol message.

11. The method according to claim 5, further comprising the step of:

i) displaying the particular information on a display device of the user.

12. The method according to claim 11, wherein the particular information is displayed using a template.

13. The method according to claim 12, wherein the template modifies the display of the particular information on the display device of the user.

14. The method according to claim 13, wherein the template is modifiable and specific for at least one of each user and the ACD system.

15. The method according to claim 1, wherein the wait time is a current wait time that at least one further external user waits to be connected to the at least one agent.

16. The method according to claim 1, wherein the wait time is an estimated wait time for a new incoming call to be connected to the at least one agent.

17. The method according to claim 1, wherein the wait time is an average wait time for a new incoming call to be connected to the at least one agent.

18. The method according to claim 1, wherein the external user is a caller.

19. A system for availing to an external user, in real time, particular information regarding the availability of at least one agent in an automatic call distribution ("ACD") system, comprising:

a processing arrangement which is programmed to:

a) receive status data from the ACD system, the status data including at least one of:

i. a number of agents available on the ACD system, ii. a rate of calls answered by the at least one agent, iii. a number of external users in a queue waiting for a connection to the at least one agent, and ii. a wait time for the connection to the at least one agent; and iv. a wait time for the connection to the at least one agent;

b) configure the status data so that the external user is able to obtain the particular information based on the status data;

c) receive, from the user, a request for the particular information, and d) forward the particular information to the user in response to the request.

20. The system according to claim 19, wherein the processing arrangement performs steps (c) and (d) prior to the user requesting a connection to the at least one agent.

21. The system according to claim 19, wherein the processing arrangement forwards the particular information to the user in an e-mail.

22. The system according to claim 19, wherein the processing arrangement stores the status data in a storage arrangement.

23. The system according to claim 22, wherein the processing arrangement is further programmed to:

e) receive a request for the particular information from the user, f) in response to the request, connect the user thereto, g) retrieve the status data from the storage arrangement, and h) provide the particular information to the user as a function of the status data retrieved from the storage arrangement.

24. The system according to claim 23, wherein the processing arrangement is a Web server.

25. The system according to claim 24, wherein the Web server is incorporated into the ACD system.

26. The system according to claim 24, wherein the Web server is separate from the ACD system.

27. The system according to claim 26, wherein the Web server receives the request from the user.

28. The system according to claim 27, wherein the request is a Hyper Text Transfer protocol message.

29. The system according to claim 23, wherein the processing arrangement is further programmed to:

i) display the particular information on a display device of the user.

30. The system according to claim 29, wherein the particular information is displayed using a template.

31. The system according to claim 30, wherein the template modifies the display of the particular information on the display device of the user.

32. The system according to claim 31, wherein the template is modifiable and specific for at least one of each user and the ACD system.

33. The system according to claim 19, wherein the wait time is a current wait time that at least one further external user waits to be connected to the at least one agent.

34. The system according to claim 19, wherein the wait time is an estimated wait time for a new incoming call to be connected to the at least one agent.

35. The system according to claim 19, wherein the wait time is an average wait time for a new incoming call to be connected to the at least one agent.

36. The system according to claim 19, wherein the external user is a caller.

37. A method for availing to a caller, in real time, particular information regarding the availability of at least one agent in an automatic call distribution ("ACD") system, comprising the steps of:

a) receiving status data from the ACD system, the status data including at least one of:

i. a number of agents available on the ACD system, ii. a rate of calls answered by the at least one agent, iii. a number of callers in a queue waiting for a connection to the at least one agent, and iv. a wait time for the connection to the at least one agent; and b) configuring the status data so that a caller is able to obtain the particular information based on the status data;

c) receiving a request for the particular information from the caller;

d) retrieving the status data by the processing arrangement; and e) providing the particular information to the caller from the processing arrangement as a function of the configured status data, wherein step (e) is performed prior to the user requesting a connection to the at least one agent.

38. A system for availing to a caller, in real time, particular information regarding the availability of at least one agent in an automatic call distribution ("ACD") system, comprising:

a processing arrangement configured to:

a) receive status data from the ACD system, the status data including at least one of:
   i. a number of agents available on the ACD system,
   ii. a rate of calls answered by the at least one agent,
   iii. a number of callers in a queue waiting for a connection to the at least one agent, and
   iv. a wait time for the connection to the at least one agent; and b) configure the status data so that a caller the user is able to obtain the particular information based on the status data;

c) receive a request for the particular information from the caller;

d) retrieve the status data; and e) provide the particular information to the caller as a function of the configured status data, wherein the particular information is provided to the caller prior to the user requesting a connection to the at least one agent.

39. A system for availing to an external user, in real time, particular information regarding the availability of at least one agent in an automatic call distribution ("ACD") system, comprising:

means for receiving status data from the ACD system, the status data including at least one of:
   i. a number of agents available on the ACD system,
   ii. a rate of calls answered by the at least one agent,
   iii. a number of external users in a queue waiting for a connection to the at least one agent, and
   iv. a wait time for the connection to the at least one agent: and means for configuring the status data so that the external user is able to obtain the particular information based on the status data;

means for receiving, from the user, a request for the particular information; and means for forwarding the particular information to the user in response to the request.

40. Logic encoded in a processing arrangement and operable to avail to an external user, in real time, particular information regarding the availability of at least one agent in an automatic call distribution ("ACD") system by executing the steps comprising of:

a) receiving status data from the ACD system, the status data including at least one of:
   i. a number of agents available on the ACD system,
   ii. a rate of calls answered by the at least one agent,
   iii. a number of external users in a queue waiting for a connection to the at least one agent, and
   iv. a wait time for the connection to the at least one agent;

b) configuring the status data so that the external user is able to obtain the particular information based on the status data;

c) receiving, from the user, a request for the particular information; and d) forwarding the particular information to the user in response to the request.

41. The logic according to claim 40, wherein the logic is operable to perform steps (c) and (d) prior to the user requesting a connection to the at least one agent.

42. The logic according to claim 40, wherein the logic is operable to forward the, the particular information to the user by forwarding the particular information to the user in an e-mail in response to the request.

43. The logic according to claim 40, wherein the logic is further operable to store the status data in a storage arrangement.

44. The logic according to claim 40, wherein the logic is further operable to perform the steps of:

e) receiving a request for the particular information from the user;

f) in response to the request, connecting the user to a processing arrangement which communicates with the storage arrangement;

g) retrieving the status data, from the storage arrangement, by the processing arrangement; and h) providing the particular information to the user from the processing arrangement as a function of the status data retrieved from the storage arrangement.

45. The logic according to claim 44, wherein the logic is operable to connect the user to a processing arrangement by connecting the user to a Web server.

46. The logic according to claim 45, wherein the logic is operable to connect the user to the Web server by connecting the user to a Web Server that is incorporated into the ACD system.

47. The logic according to claim 45, wherein the logic is operable to connect the user to the Web server by connecting the user to a Web Server that is separate from the ACD system.

48. The logic according to claim 47, wherein the logic is operable to receive the request by receiving the request at the Web server.

49. The logic according to claim 48, wherein the logic is operable to receive the request at the Web server by receiving a Hyper Text Transfer protocol message at the Web server.

50. The logic according to claim 44, wherein the logic is further operable to perform the step of:

i) displaying the particular information on a display device of the user.

51. The logic according to claim 50, wherein the logic is operable to display the particular information using a template.

52. The logic according to claim 51, wherein the logic is operable to display the particular information using the template by displaying the particular information using a template that modifies the display of the particular information on the display device of the user.

53. The logic according to claim 51, wherein the logic is operable to display the particular information using the template by displaying the particular information using a template that is modifiable and specific for at least one of each user and the ACD system.

54. The logic according to claim 40, wherein the wait time is a current wait time that at least one further external user waits to be connected to the at least one agent.

55. The logic according to claim 40, wherein the wait time is an estimated wait time for a new incoming call to be connected to the at least one agent.

56. The logic according to claim 40, wherein the wait time is an average wait time for a new incoming call to be connected to the at least one agent.

57. The logic according to claim 40, wherein the external user is a caller.

58. A system for availing to an external user, in real time, particular information regarding the availability of at least one agent in an automatic call distribution ("ACD") system, comprising:
- means for receiving status data from the ACD system, the status data including at least one of:
  - i. a number of agents available on the ACD system,
  - ii. a rate of calls answered by the at least one agent,
  - iii. a number of external users in a queue waiting for a connection to the at least one agent, and
  - iv. a wait time for the connection to the at least one agent; and
- means for storing the status data in a storage arrangement;
- means for configuring the status data so that the external user is able to obtain the particular information based on the status data;
- means for receiving a request for the particular information from the user;
- means for connecting the user, in response to the request, to a processing arrangement which communicates with the storage arrangement;
- means for retrieving the status data, from the storage arrangement, by the processing arrangement; and
- means for providing the particular information to the user from the processing arrangement as a function of the status data retrieved from the storage arrangement.

59. A method for availing to an external user, in real time, particular information regarding the availability of at least one agent in an automatic call distribution ("ACD") system, comprising the steps of:
- a) receiving status data from the ACD system, the status data including at least one of:
  - i. a number of agents available on the ACD system,
  - ii. a rate of calls answered by the at least one agent,
  - iii. a number of external users in a queue waiting for a connection to the at least one agent, and
  - iv. a wait time for the connection to the at least one agent;
- b) configuring the status data so that the external user is able to obtain the particular information based on the status data and storing the status data in a storage arrangement;
- c) receiving a request for the particular information from the user;
- d) in response to the request, connecting the user to a processing arrangement which communicates with the storage arrangement;
- e) retrieving the status data, from the storage arrangement, by the processing arrangement; and
- f) providing the particular information to the user from the processing arrangement as a function of the status data retrieved from the storage arrangement.

60. The method according to claim 59, wherein connecting the user to a processing arrangement comprises connecting the user to a Web server.

61. The method according to claim 60, wherein connecting the user to the Web server comprises connecting the user to a Web server that is incorporated into the ACD system.

62. The method according to claim 60, wherein connecting the user to the Web server comprises connecting user to a Web server that is separate from the ACD system.

63. The method according to claim 62, wherein receiving the request comprises receiving, at the Web server, the request for the particular information from the user.

64. The method according to claim 63, wherein receiving the request further comprises receiving a Hyper Text Transfer protocol message.

65. The method according to claim 59, further comprising the step of:
- g) displaying the particular information on a display device of the user.

66. The method according to claim 65, wherein displaying the particular information comprises displaying, using a template, the particular information on a display device of the user.

67. The method according to claim 66, wherein displaying using the template comprises displaying, using a template that modifies the display of the display device, the particular information on the display device.

68. The method according to claim 66, wherein displaying using the template comprises displaying using a template that is modifiable and specific for at least one of each user and the ACD system.

69. The method according to claim 59, wherein the wait time is a current wait time that at least one further external user waits to be connected to the at least one agent.

70. The method according to claim 59, wherein the wait time is an estimated wait time for a new incoming call to be connected to the at least one agent.

71. The method according to claim 59, wherein the wait time is an average wait time for a new incoming call to be connected to the at least one agent.

72. The method according to claim 59, wherein the external user is a caller.

73. A system for availing to an external user, in real time, particular information regarding the availability of at least one agent in an automatic call distribution ("ACD") system, comprising:
- a processing arrangement which is programmed to:
  - a) receive status data from the ACD system, the status data including at least one of:
    - i. a number of agents available on the ACD system,
    - ii. a rate of calls answered by the at least one agent,
    - iii. a number of external users in a queue waiting for a connection to the at least one agent, and
    - iv. a wait time for the connection to the at least one agent;
  - b) configure the status data so that the external user is able to obtain the particular information based on the status data and stores the status data in a storage arrangement;
  - c) receive a request for the particular information from the user,
  - d) in response to the request, connect the user thereto,
  - e) retrieve the status data from the storage arrangement, and
  - f) provide the particular information to the user as a function of the status data retrieved from the storage arrangement.

74. The system according to claim 73, wherein the processing arrangement is a Web server.

75. The system according to claim 74, wherein the Web server is incorporated into the ACD system.

76. The system according to claim 74, wherein the Web server is separate from the ACD system.

77. The system according to claim 76, wherein the Web server receives the request from the user.

78. The system according to claim 77, wherein the request is a Hyper Text Transfer protocol message.

79. The system according to claim 73, wherein the processing arrangement is further programmed to:
  g) display the particular information on a display device of the user.

80. The system according to claim 79, wherein the particular information is displayed using a template.

81. The system according to claim 80, wherein the template modifies the display of the particular information on the display device of the user.

82. The system according to claim 81, wherein the template is modifiable and specific for at least one of each user and the ACD system.

83. The system according to claim 75, wherein the wait time is a current wait time that at least one further external user waits to be connected to the at least one agent.

84. The system according to claim 73, wherein the wait time is an estimated wait time for a new incoming call to be connected to the at least one agent.

85. The system according to claim 73, wherein the wait time is an average wait time for a new incoming call to be connected to the at least one agent.

86. The system according to claim 73, wherein the external user is a caller.

87. Logic encoded in a processing arrangement and operable to avail to an external user, in real time, particular information regarding the availability of at least one agent in an automatic call distribution ("ACD") system by executing the steps comprising of:
  a) receiving status data from the ACD system, the status data including at least one of:
    i. a number of agents available on the ACD system,
    ii. a rate of calls answered by the at least one agent,
    iii. a number of external users in a queue waiting for a connection to the at least one agent, and
    iv. a wait time for the connection to the at least one agent;
  b) configuring the status data so that the external user is able to obtain the particular information based on the status data and storing the status data in a storage arrangement;
  c) receiving a request for the particular information from the user;
  d) in response to the request, connecting the user to a processing arrangement which communicates with the storage arrangement;
  e) retrieving the status data, from the storage arrangement, by the processing arrangement; and
  f) providing the particular information to the user from the processing arrangement as a function of the status data retrieved from the storage arrangement.

88. The logic according to claim 87, wherein the logic is operable to connect the user to a processing arrangement by connecting the user to a Web server.

89. The logic according to claim 88, wherein the logic is operable to connect the user to the Web server by connecting the user to a Web Server that is incorporated into the ACD system.

90. The logic according to claim 89, wherein the logic is operable to connect the user to the Web server by connecting the user to a Web Server that is separate from the ACD system.

91. The logic according to claim 90, wherein the logic is operable to receive the request by receiving the request at the Web server.

92. The logic according to claim 91, wherein the logic is operable to receive the request at the Web server by receiving a Hyper Text Transfer protocol message at the Web server.

93. The logic according to claim 87, wherein the logic is further operable to perform the step of:
  g) displaying the particular information on a display device of the user.

94. The logic according to claim 93, wherein the logic is operable to display the particular information using a template.

95. The logic according to claim 94, wherein the logic is operable to display the particular information using the template by displaying the particular information using a template that modifies the display of the particular information on the display device of the user.

96. The logic according to claim 95, wherein the logic is operable to display the particular information using the template by displaying the particular information using a template that is modifiable and specific for at least one of each user and the ACD system.

97. The logic according to claim 87, wherein the wait time is a current wait time that at least one further external user waits to be connected to the at least one agent.

98. The logic according to claim 87, wherein the wait time is an estimated wait time for a new incoming call to be connected to the at least one agent.

99. The logic according to claim 87, wherein the wait time is an average wait time for a new incoming call to be connected to the at least one agent.

100. The logic according to claim 87, wherein the external user is a caller.

* * * * *

UNITED STATES PATENT AND TRADEMARK OFFICE
CERTIFICATE OF CORRECTION

PATENT NO. : 6,850,615 B1  
DATED : February 1, 2005  
INVENTOR(S) : Labhesh Patel et al.

It is certified that error appears in the above-identified patent and that said Letters Patent is hereby corrected as shown below:

<u>Title page,</u>  
Item [57], ABSTRACT,  
Line 8, after "connected" insert -- to --.

<u>Column 7,</u>  
Lines 54-55, delete "ii. a wait time...one agent; and".

<u>Column 9,</u>  
Line 21, after "caller" delete "the user".

<u>Column 13,</u>  
Line 13, after "claim" delete "75" and insert -- 73 --.

Signed and Sealed this

Second Day of May, 2006

JON W. DUDAS  
*Director of the United States Patent and Trademark Office*